(12) United States Patent
Yumii (10) Patent No.: US 12,054,010 B2
(45) Date of Patent: Aug. 6, 2024

(54) TIRE

(71) Applicant: BRIDGESTONE CORPORATION, Tokyo (JP)

(72) Inventor: Keita Yumii, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 172 days.

(21) Appl. No.: 17/756,777

(22) PCT Filed: Jul. 10, 2020

(86) PCT No.: PCT/JP2020/027137
§ 371 (c)(1),
(2) Date: Jun. 2, 2022

(87) PCT Pub. No.: WO2021/117282
PCT Pub. Date: Jun. 17, 2021

(65) Prior Publication Data
US 2023/0001746 A1    Jan. 5, 2023

(30) Foreign Application Priority Data
Dec. 12, 2019   (JP) .................. 2019-224893

(51) Int. Cl.
*B60C 11/12*   (2006.01)
*B60C 11/03*   (2006.01)

(52) U.S. Cl.
CPC ...... *B60C 11/1281* (2013.01); *B60C 11/0323* (2013.01)

(58) Field of Classification Search
CPC ............ B60C 11/0323; B60C 11/1218; B60C 11/1281
See application file for complete search history.

(56) References Cited

U.S. PATENT DOCUMENTS

| 5,316,063 | A  | 5/1994  | Lagnier        |
| 6,461,135 | B1 | 10/2002 | Lagnier et al. |
| 10,245,891 | B2 | 4/2019 | Cambon et al.  |
| 10,449,808 | B2 | 10/2019 | Satoi          |

(Continued)

FOREIGN PATENT DOCUMENTS

| CN | 102421608 A | 4/2012 |
| CN | 107053959 A | 8/2017 |

(Continued)

OTHER PUBLICATIONS

English machine translation of JP2009280035 (Year: 2009).*

(Continued)

*Primary Examiner* — Robert C Dye
(74) *Attorney, Agent, or Firm* — KENJA IP LAW PC (57) ABSTRACT

A tire according to the present disclosure is a tire including, in a tread surface, a tread land portion partitioned by a partitioning groove or by the partitioning groove and a tread edge. The tread land portion includes a sipe extending from a surface of the tread land portion inwardly in a tire radial direction. The sipe includes a widened portion with a larger sipe width than a position adjacent in a sipe longitudinal direction. The cross-sectional area of the widened portion in cross section perpendicular to the tire radial direction is larger on inside than on outside in the tire radial direction.

2 Claims, 9 Drawing Sheets

(56) References Cited

U.S. PATENT DOCUMENTS

| | | | |
|---|---|---|---|
| 2002/0157749 A1* | 10/2002 | Neumann | B60C 11/1369 |
| | | | 152/209.24 |
| 2012/0055601 A1 | 3/2012 | Christenbury | |
| 2012/0234443 A1* | 9/2012 | Kurokawa | B60C 11/1281 |
| | | | 152/209.18 |
| 2014/0090761 A1 | 4/2014 | Foucher et al. | |
| 2014/0130950 A1 | 5/2014 | Guichon | |
| 2015/0273950 A1 | 10/2015 | Martin et al. | |
| 2015/0306915 A1 | 10/2015 | Ledieu et al. | |
| 2016/0318347 A1 | 11/2016 | Bardin et al. | |
| 2019/0118583 A1 | 4/2019 | Nakamura et al. | |
| 2019/0241022 A1 | 8/2019 | Ishigaki | |
| 2020/0180362 A1 | 6/2020 | Kaji | |

FOREIGN PATENT DOCUMENTS

| | | | | |
|---|---|---|---|---|
| DE | 102018217712 A1 * | 4/2020 | | |
| EP | 3560734 A1 | 10/2019 | | |
| JP | 03001910 A * | 1/1991 | | B60C 11/12 |
| JP | 2000211320 A * | 8/2000 | | B60C 11/1281 |
| JP | 2008290573 A | 12/2008 | | |
| JP | 2009078654 A | 4/2009 | | |
| JP | 2009280035 A * | 12/2009 | | |
| JP | 2009280035 A | 12/2009 | | |
| JP | 2012001030 A | 1/2012 | | |
| JP | 2013126842 A | 6/2013 | | |
| JP | 2014522772 A | 9/2014 | | |
| JP | 6061306 B2 | 1/2017 | | |
| JP | 2017087862 A | 5/2017 | | |
| JP | 2017193202 A | 10/2017 | | |
| JP | 2019104344 A | 6/2019 | | |
| JP | 2019135124 A | 8/2019 | | |
| WO | 2017039679 A1 | 3/2017 | | |
| WO | 2017183579 A1 | 10/2017 | | |
| WO | 2018235464 A1 | 12/2018 | | |
| WO | WO-2020128281 A1 * | 6/2020 | | B60C 11/0306 |
| WO | WO-2021013439 A1 * | 1/2021 | | B60C 11/032 |

OTHER PUBLICATIONS

English machine translation of WO2021013439 (Year: 2021).*
English machine translation of JPH03001910 (Year: 1991).*
Sep. 15, 2020, International Search Report issued in the International Patent Application No. PCT/JP2020/027137.
Oct. 19, 2022, search result of the Extended European Search Report issued by the European Patent Office in the corresponding European Patent Application No. 20899208.1.
Jan. 18, 2023, search result of Office Action issued by the China National Intellectual Property Administration in the corresponding Chinese Patent Application No. 202080085079.6.
May 17, 2022, International Preliminary Report on Patentability issued in the International Patent Application No. PCT/JP2020/027137.

* cited by examiner

TIRE

TECHNICAL FIELD

The present disclosure relates to a tire.

BACKGROUND

Tires that include tread land portions with sipes are known. Patent Literature (PTL) 1 describes a tire of this type.

CITATION LIST

Patent Literature

PTL 1: JP 2019-104344

SUMMARY

Technical Problem

As in a tire described in PTL 1, the provision of sipes in a tread land portion improves wet gripping performance. However, as wear on a surface of the tread land portion progresses, compressive stiffness of the tread land portion increases. As a result, the contact area between the surface of the tread land portion and a road surface becomes small, the wet gripping performance deteriorates as compared to an initial state before the progress of the wear (hereinafter simply referred to as "initial state"). Namely, there is still room for improvement in the wet gripping performance of the tire described in PTL 1 during the progress of the wear on the tread land portion.

It would be helpful to provide a tire having sipes that are capable of improving wet gripping performance during the progress of wear on a tread land portion.

Solution to Problem

A tire as a first aspect of the present disclosure is a tire including, in a tread surface, a tread land portion partitioned by a partitioning groove or by the partitioning groove and a tread edge, wherein
  the tread land portion includes a sipe extending from a surface of the tread land portion inwardly in a tire radial direction,
  the sipe includes a widened portion with a larger sipe width than a position adjacent in a sipe longitudinal direction, and
  the cross-sectional area of the widened portion in cross section perpendicular to the tire radial direction is larger on the inside than on the outside in the tire radial direction.

Advantageous Effect

According to the present disclosure, it is possible to provide a tire having sipes that are capable of improving wet gripping performance during the progress of wear on a tread land portion.

DETAILED DESCRIPTION

Embodiments of a tire according to the present disclosure will be exemplarily described with reference to the drawings. In each figure, common members and components are indicated with the same reference numerals.

In this specification, "tread surface" means an outer circumferential surface over an entire circumference of the tire that comes into contact with a road surface when the tire mounted on a rim and filled with a specified internal pressure is rolled under a maximum load (hereinafter also referred to as "maximum load condition"). "Tread edges" refer to outer edges of the tread surface in a tire width direction.

In this specification, "rim" means a standard rim (Measuring Rim in ETRTO's STANDARDS MANUAL and Design Rim in TRA's YEAR BOOK) in an applicable size as described in or to be described in an industrial standard valid for regions where tires are produced and used, such as JATMA YEAR BOOK of the JATMA (The Japan Automobile Tyre Manufacturers Association, Inc.) in Japan, STANDARDS MANUAL of the ETRTO (The European Tyre and Rim Technical Organisation) in Europe, YEAR BOOK of TRA (The Tire and Rim Association, Inc.) in the United States, and the like, but in the case of a size not listed in these industrial standards, the "applicable rim" refers to a rim with a width corresponding to a bead width of tires. The term "rim" includes current sizes, as well as sizes that may be to be included in the aforementioned industrial standards in the future. Examples of the "sizes to be included in the future" may be sizes listed as "FUTURE DEVELOPMENTS" in the 2013 edition of STANDARDS MANUAL of the ETRTO.

In this specification, "specified internal pressure" refers to an air pressure (maximum air pressure) corresponding to a maximum load capacity of a single wheel in the applicable size and ply rating described in the aforementioned JATMA YEAR BOOK or other industrial standards. In the case of sizes not listed in the aforementioned industrial standards, the "specified internal pressure" refers to an air pressure (maximum air pressure) corresponding to a maximum load capacity specified for each vehicle on which the tire is mounted. Also, in this specification, "maximum load" means a load corresponding to a maximum load capacity in the applicable sized tire described in the aforementioned industrial standards, or, in the case of a size not listed in the aforementioned industrial standards, a load corresponding to a maximum load capacity specified for each vehicle on which the tire is mounted.

First Embodiment

Figure 1:
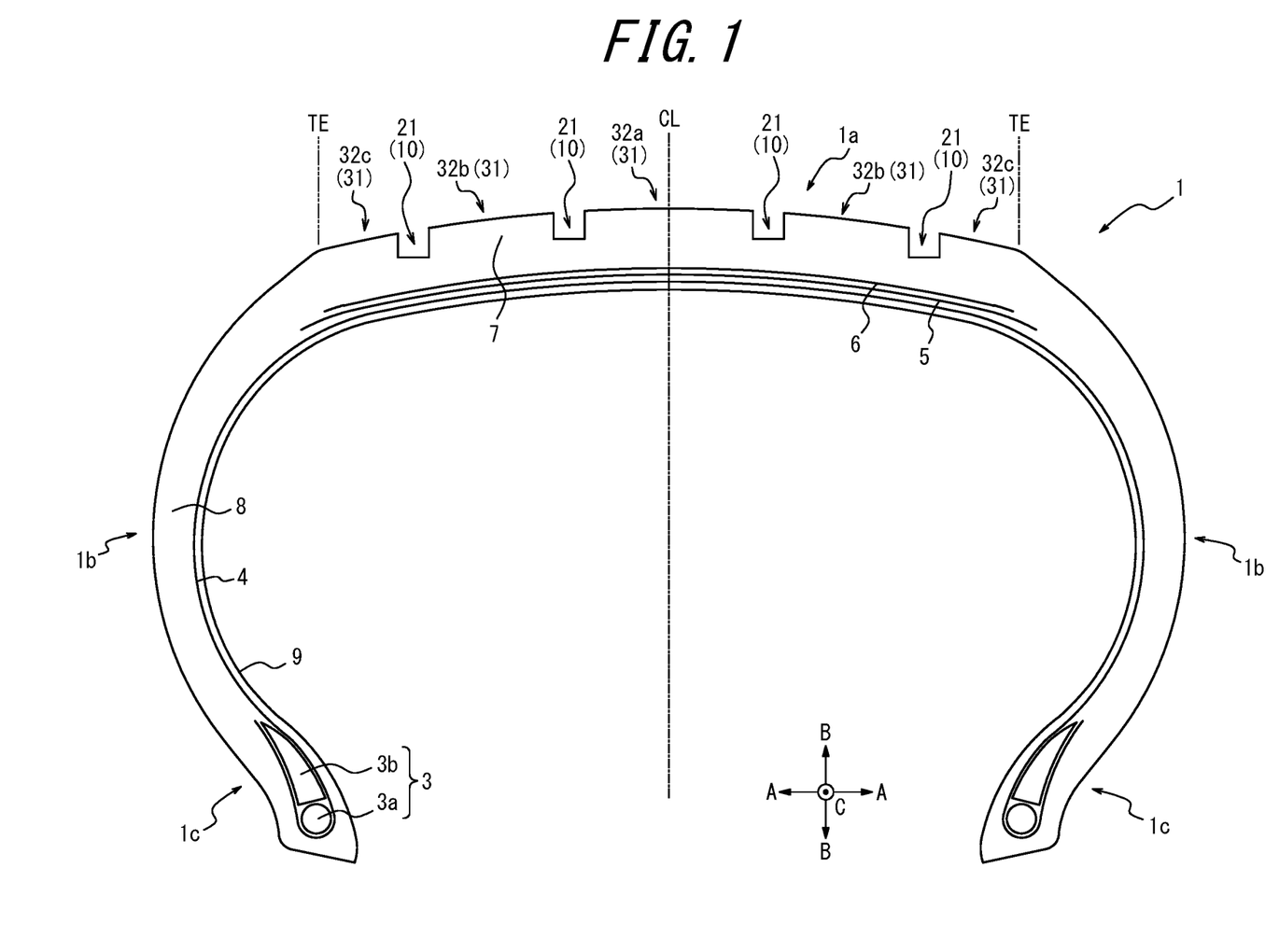
FIG. 1 is a tire widthwise sectional view of a tire as a first embodiment of the present disclosure.

FIG. 1 is a drawing illustrating a pneumatic tire 1 (hereinafter referred to simply as "tire 1") as a first embodiment of the tire according to the present disclosure. FIG. 1 illustrates a tire widthwise cross section of the tire 1 in a plane including a central axis.

As illustrated in FIG. 1, the tire 1 includes a tread portion 1a, a pair of sidewall portions 1b extending from both ends of the tread portion 1a in a tire width direction B to the inside in a tire radial direction A, and a pair of bead portions 1c provided at inner ends of the sidewall portions 1b in the tire radial direction A. The tire 1 according to the present embodiment is a tubeless type radial tire, but the configuration thereof is not particularly limited. The "tread portion 1a" refers to a portion sandwiched between tread edges TE on both sides in the tire width direction B. Each of the "bead portions 1c" refers to a portion where a bead member 3 described later is located in the tire radial direction A. Each of the "sidewall portions 1b" refers to a portion between the tread portion 1a and the bead portion 1c.

The tire 1 of the present embodiment includes the bead members 3, a carcass 4, an inclined belt 5, a circumferential belt 6, tread rubber 7, side rubber 8, and an inner liner 9. Each of the bead members 3 includes a bead core 3a and a bead filler 3b.

The bead member 3 is provided with the bead core 3a and the bead filler 3b that is disposed outside the bead core 3a in the tire radial direction A. The tire 1 is provided with the carcass 4 that straddles between the pair of bead cores 3a. The carcass 4 is composed of a carcass ply in which cords made of steel or the like are arranged. Furthermore, the tire 1 is provided with the inclined belt 5 that is disposed outside a crown portion of the carcass 4 in the tire radial direction A. The inclined belt 5 is composed of a belt ply in which cords made of organic fibers, steel, or the like are arranged. In the belt ply constituting the inclined belt 5, the cords extend inclinedly at an angle of 10° or more with respect to a tire circumferential direction C. There may be two or more belt plies constituting the inclined belt 5. The tire 1 is also provided with the circumferential belt 6 disposed outside the inclined belt 5 in the tire radial direction A. The circumferential belt 6 is composed of a belt ply in which cords made of organic fibers, steel, or the like are arranged. In the belt ply constituting the circumferential belt 6, the cords extend along the tire circumferential direction C. "The cords extend along the tire circumferential direction" means that the inclination angle of the cords with respect to the tire circumferential direction C is 0° or more and less than 10°. There may be two or more belt plies constituting the circumferential belt 6.

The tire 1 is also provided with the tread rubber 7 disposed outside the circumferential belt 6 in the tire radial direction A, and the side rubber 8 disposed outside each side portion of the carcass 4 in the tire width direction B. Furthermore, the tire 1 is provided with the inner liner 9 that is laminated on an inner surface of the carcass 4.

The tire 1 of the present embodiment has the above-described cross sectional structure in the tire widthwise cross section, but not limited to this cross sectional structure and may be a tire having another cross sectional structure. The tire 1 of the present embodiment has a symmetrical structure with respect to a tire equatorial plane CL, but is not limited to this structure and may be a tire asymmetrical with respect to the tire equatorial plane CL.

The tire 1 includes, in a tread surface T, tread land portions 31 that are partitioned by partitioning grooves 10, or by the partitioning grooves 10 and the tread edges TE. Each of the "partitioning grooves" refers to a groove the minimum width of which at a groove edge is 2 mm or more when a tire in an unused state is mounted on an applicable rim and filled with a specified internal pressure, and under no load. In the tire 1 of the present embodiment, each of the tread land portions 31 is partitioned by circumferential grooves 21 as the partitioning grooves 10, or by the circumferential groove 21 and the tread edge TE. Each of the "circumferential grooves" refers to the partitioning groove, and an annular groove extending over the entire circumference of the tire circumferential direction C along the tire circumferential direction C. The circumferential grooves 21 of the present embodiment extend in parallel to the tire circumferential direction C but may be inclined at an angle of 5° or less with respect to the tire circumferential direction C, as long as the circumferential grooves 21 extend along the tire circumferential direction C. The circumferential grooves 21 of the present embodiment extend in straight lines in developed view of the tread surface T, but are not limited to this configuration and may extend in zigzag or wavy shapes along the tire circumferential direction C. Note that, the tire 1 may have one or more widthwise grooves extending in the tire width direction B, as the partitioning grooves 10.

More specifically, the tread surface T of the present embodiment is provided with four of the circumferential grooves 21 and three rib-shaped land portions, as the tread land portions 31, each partitioned between adjacent two of the four circumferential grooves 21. Each of the "rib-shaped land portions" means an annular land portion that is partitioned between two of the circumferential grooves, that is not divided into separate land portions in the tire circumferential direction C by a partitioning groove extending in the tire width direction B, that is continuous over the entire circumference in the tire circumferential direction C. The three rib-shaped land portions of the present embodiment include a center land portion 32a and two intermediate land portions 32b adjacent to the center land portion 32a on both sides in the tire width direction B. In addition, shoulder land portions 32c are each partitioned between each of two of the circumferential grooves 21 on both outer sides in the tire width direction B, of the four circumferential grooves 21, and the tread edge TE. The shoulder land portion 32c may be constituted of, for example, block-shaped land portions, as a plurality of the tread land portions 31, which are partitioned by the tread edges TE and the partitioning grooves.

Figure 2:
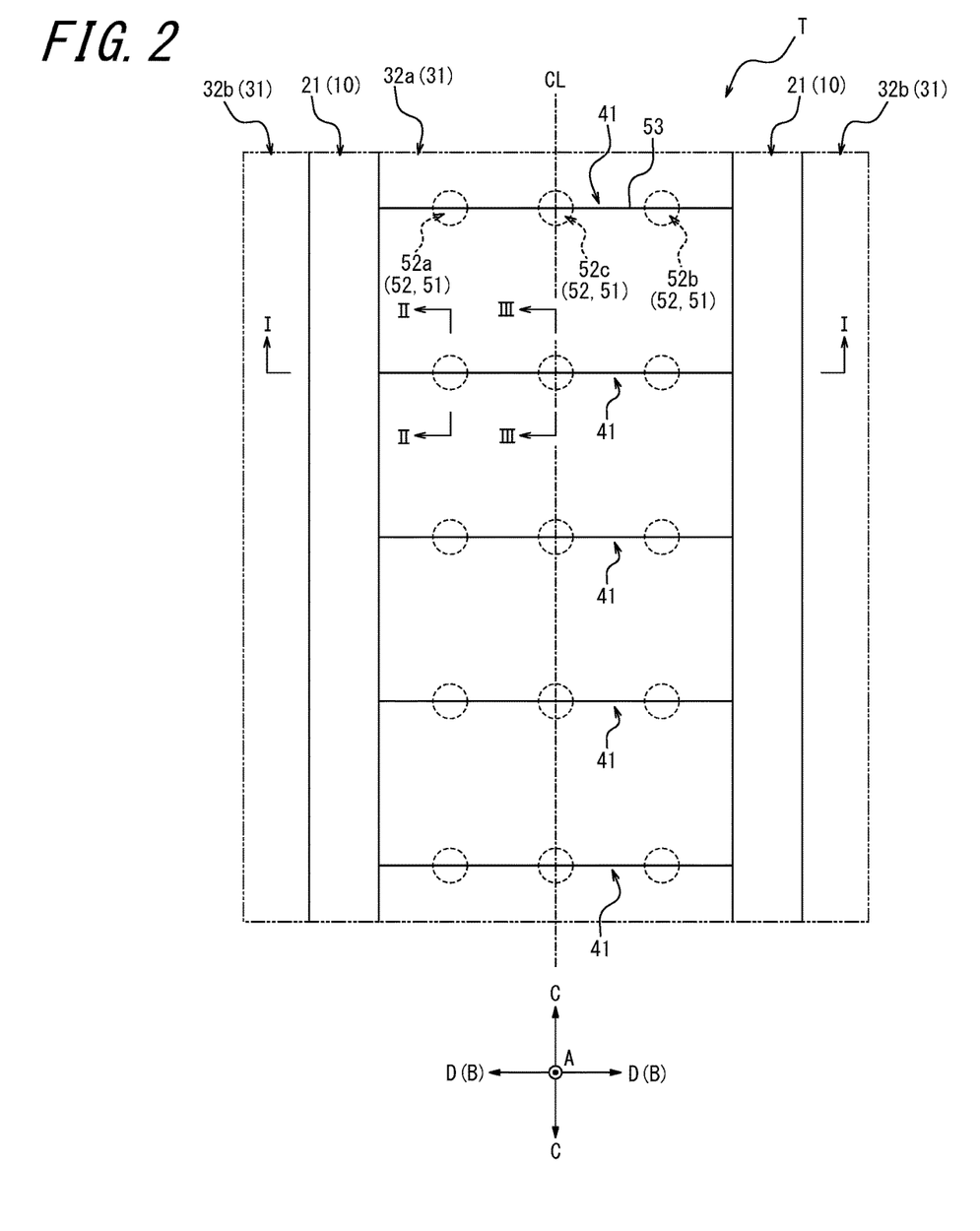
FIG. 2 is a developed view illustrating a part of a tread surface of a tread portion of the tire illustrated in FIG. 1.
Figure 3:
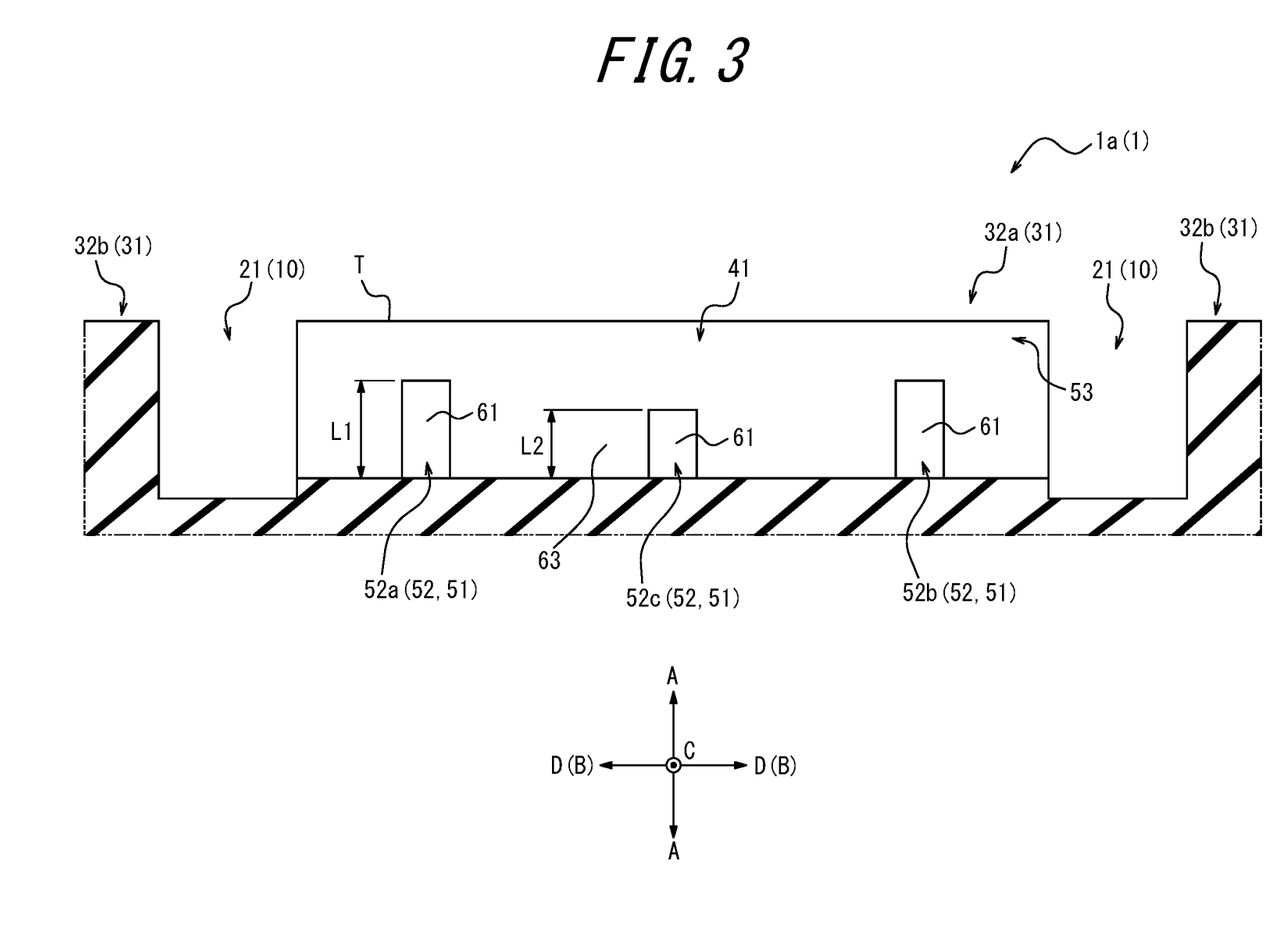
FIG. 3 is a sectional view taken along the line I-I of FIG. 2.
Figure 4:
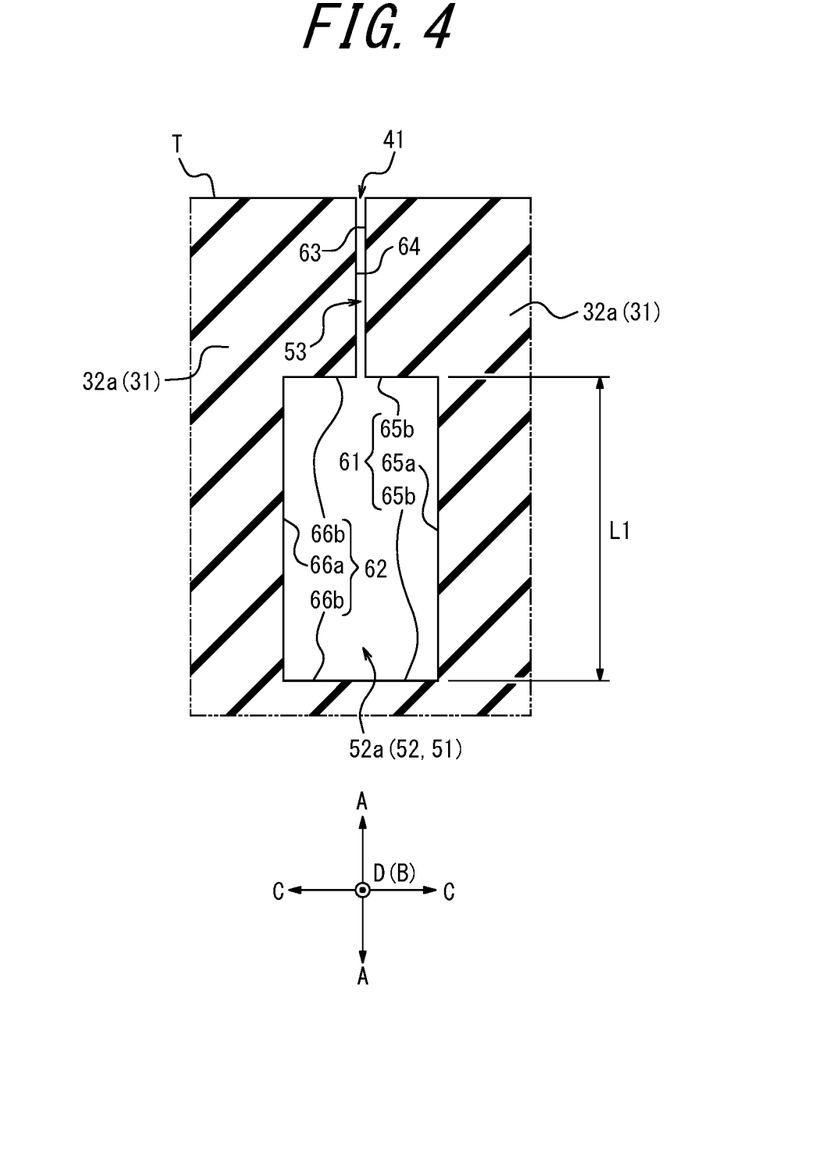
FIG. 4 is a sectional view taken along the line II-II of FIG. 2.
Figure 5:
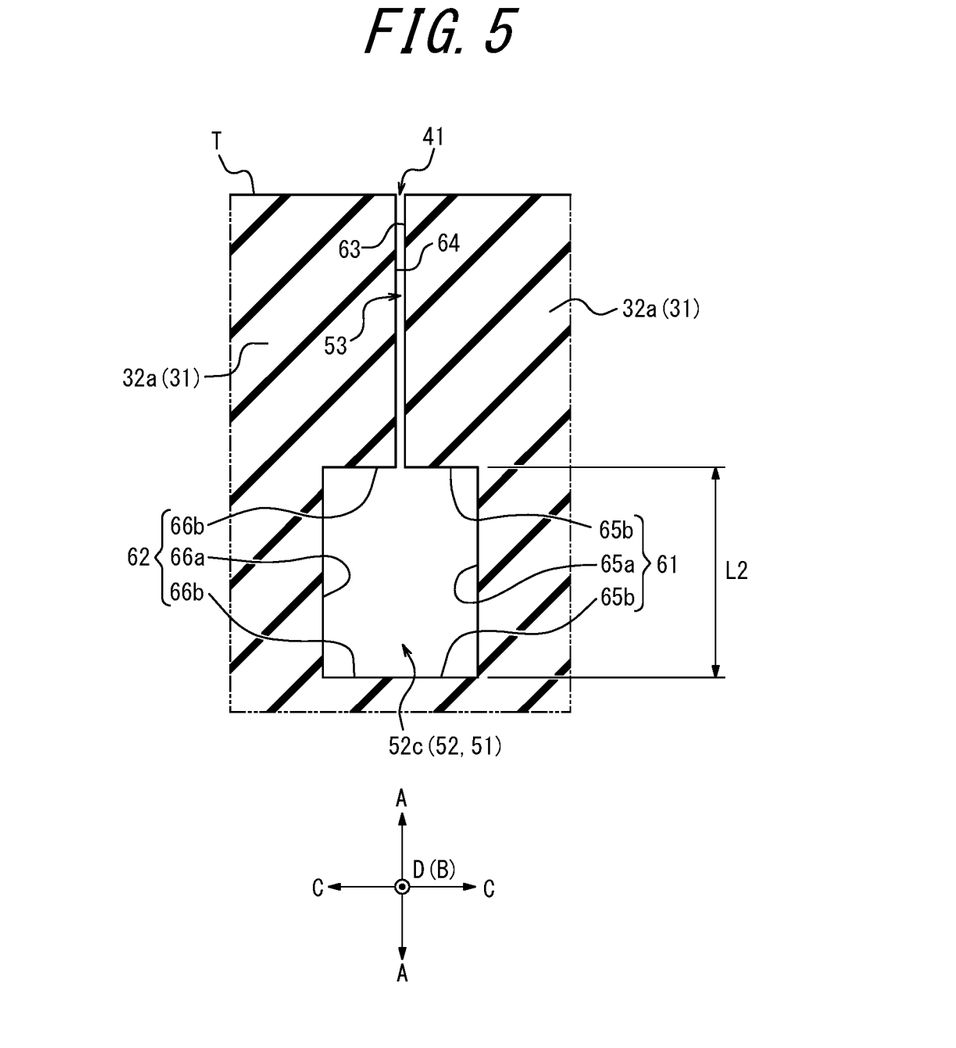
FIG. 5 is a sectional view taken along the line of FIG. 2.

FIG. 2 is a developed view illustrating a part of the tread surface T of the tread portion 1a of the tire 1. Specifically, FIG. 2 is a developed view illustrating the center land portion 32a and a vicinity of the center land portion 32a in the tread surface T. FIG. 3 is a cross sectional view along the line I-I of FIG. 2. FIG. 4 is a cross sectional view along the lines II-II of FIG. 2. FIG. 5 is a cross sectional view along the line of FIG. 2.

As illustrated in FIGS. 2 to 5, the center land portion 32a, being the rib-shaped land portion, includes sipes 41 extending from a surface of the center land portion 32a to the inside in the tire radial direction A. Each of the "sipes" means a groove that extends from a tread surface to the inside in a tire radial direction and a groove the maximum width of which at the tread surface is less than 2 mm when a tire in an unused state is mounted on an applicable rim and filled with a specified internal pressure, and under no load. The sipes 41 are provided in the center land portion 32a, but where to provide the sipes 41 is not particularly limited as long as the sipes 41 are provided in the tread land portion 31. Accordingly, the sipes 41 may be provided in any tread land portion 31, regardless of whether the tread land portion 31 is the center land portion 32a, the intermediate land portion 32b, or the shoulder land portion 32c, and further regardless of the tread land portion 31 is the rib-shaped land portion or the block-shaped land portion. Therefore, in the following, when the center land portion 32a, the intermediate land portions 32b, and the shoulder land portions 32c are not distinguished, and when the rib-shaped land portions and the block-shaped land portions are not distinguished, these land portions are simply described as "tread land portions 31".

As illustrated in FIGS. 2 to 5, the sipe 41 includes a widened portion 51 with a larger sipe width than positions adjacent in a sipe longitudinal direction D. The "sipe longitudinal direction" is a direction in which the sipe 41 extends in the tread surface T. The "sipe width" refers to the distance between opposite inner walls constituting the sipe. The sipe width of the sipe 41 in the present embodiment is the distance between opposite inner walls in a direction (same direction as the tire circumferential direction C in the present embodiment) perpendicular to the tire radial direction A and the sipe longitudinal direction D (same direction as the tire width direction B in the present embodiment).

In addition, the cross-sectional area of the widened portion 51 in cross section perpendicular to the tire radial direction A is larger on the inside than on the outside in the tire radial direction A. Thereby, even when wear on a surface of the tread land portion 31 progresses, increase in the cross-sectional area of the widened portion 51 can prevent increase in the compressive stiffness of the tread land portion 31. In this way, the sipes 41 can improve wet grip performance during the progress of the wear on of the tread land portion 31.

As illustrated in FIGS. 2 to 5, the widened portion 51 of the present embodiment includes three tubular portions 52 with different lengths in the tire radial direction A. The three tubular portions 52 extend from a bottom of the sipe outwardly in the tire radial direction A at different positions in the sipe longitudinal direction D. The tubular portions 52 have larger sipe widths than positions adjacent in the sipe longitudinal direction D. More specifically, each of the tubular portions 52 of the present embodiment is constituted of a first recess 61 formed in one of the inner walls of the sipe 41 and a second recess 62 formed in the other inner wall of the sipe 41. The first recess 61 and the second recess 62 are located opposite each other. The first recess 61 is constituted of a curved surface 65a, which is in an arc shape in cross section perpendicular to the tire radial direction A and extends in the tire radial direction A, and flat bottom surfaces 65b, which are located on the inside and outside in the tire radial direction A with respect to the curved surface 65a so as to be opposite each other. The second recess 62 is constituted of a curved surface 66a, which is in an arc shape in cross section perpendicular to the tire radial direction A and extends in the tire radial direction A, and flat bottom surfaces 66b, which are located on the inside and outside in the tire radial direction A with respect to the curved surface 66a so as to be opposite each other. Note that, the bottom surface 65b of the first recess 61 located on the inside in the tire radial direction A and the bottom surface 66b of the second recess 62 located on the inside in the tire radial direction A are continuous to be flush with each other at the bottom of the sipe and constitute the same plane. In contrast, the bottom surface 65b of the first recess 61 located on the outside in the tire radial direction A and the bottom surface 66b of the second recess 62 located on the outside in the tire radial direction A are separated by a slit 53 and not continuous.

Conversely, positions of the sipe 41 that are adjacent to the tubular portions 52 in the sipe longitudinal direction D do not constitute the widened portion 51. In other words, in one of the inner walls of the sipe 41 of the present embodiment, a position adjacent to the first recess 61 in the sipe longitudinal direction D is composed of a first flat portion 63 parallel to the sipe longitudinal direction D. In addition, in the other inner wall of the sipe 41 of the present embodiment, a position adjacent to the second recess 62 in the sipe longitudinal direction D is composed of a second flat portion 64 parallel to the sipe longitudinal direction D. Note that, in the present embodiment, a portion of one of the inner walls of the sipe 41 that is outside the first recess 61 in the tire radial direction A is composed of a flat portion that is flush with the first flat portion 63. Also, in the present embodiment, a portion of the other inner wall of the sipe 41 that is outside the second recess 62 in the tire radial direction A is composed of a flat portion that is flush with the second flat portion 64. Therefore, the sipe 41 of the present embodiment is constituted of the tubular portions 52, which are each constituted of the first recess 61 and the second recess 62, and the slit 53, which is constituted of the flat portion including the first flat portion 63 (hereinafter, the entire flat portion including the first flat portion 63 is hereinafter simply referred to as "first flat portion 63", for convenience of explanation) and the flat portion including the second flat portion 64 (hereinafter, the entire flat portion including the second flat portion 64 is hereinafter simply referred to as "second flat portion 64", for convenience of explanation).

The minimum sipe width of the tubular portion 52 is equal to or larger than the maximum sipe width of the slit 53. In other words, the minimum sipe width between the first recess 61 and the second recess 62 is equal to or larger than the maximum sipe width between the first flat portion 63 and the second flat portion 64. The sipe width of the slit 53 of the present embodiment is constant regardless of the position in the tire radial direction A and the position in the sipe longitudinal direction D. The maximum sipe width of the slit 53 of the present embodiment is not particularly limited as long as the maximum sipe width of the slit 53 is less than 2 mm, but may be set in a range of, for example, 0.2 mm to 1 mm. In addition, the minimum sipe width of the tubular portion 52 of the present embodiment should be equal to or larger than the maximum sipe width of the slit 53, and may be set in a range of, for example, more than 1 mm and less than 5 mm.

As described above, the sipe width of the slit 53 of the present embodiment is constant regardless of the position in the tire radial direction A and the position in the sipe longitudinal direction D, but is not limited to this configuration. The sipe width of the slit 53 may vary depending on the position in the tire radial direction A and the position in the sipe longitudinal direction D. Also, the tubular portion 52 of the present embodiment has a constant sipe width, in cross-sectional views (refer to FIGS. 4 and 5) perpendicular to the sipe longitudinal direction D, regardless of the position in the tire radial direction A, but is not limited to this configuration. The sipe width of the tubular portion 52 may vary in cross sectional views (refer to FIGS. 4 and 5) perpendicular to the sipe longitudinal direction D, depending on the position in the tire radial direction A. Thus, for example, the tubular portion 52 may have a portion the sipe width of which gradually increases from the outside to the inside in the tire radial direction A in cross sectional views (refer to FIGS. 4 and 5) perpendicular to the sipe longitudinal direction D. The tubular portion 52 may be configured such that the sipe width of the entire tubular portion 52 gradually increases from the outside to the inside in the tire radial direction A in cross sectional views (refer to FIGS. 4 and 5) perpendicular to the sipe longitudinal direction D.

As described above, the sipe 41 of the present embodiment has the three tubular portions 52 at different positions in the sipe longitudinal direction D. The three tubular portions 52 of the present embodiment include a first tubular portion 52a located on the side of one end in the tire width direction B, a second tubular portion 52b located on the side of the other end in the tire width direction B, and a third tubular portion 52c located between the first tubular portion 52a and the second tubular portion 52b in the tire width direction B. As illustrated in FIG. 3, in the present embodiment, the first tubular portion 52a and the second tubular portion 52b are approximately equal in length L1 in the tire radial direction A. Also, as illustrated in FIG. 3, in the present embodiment, the length L2 of the third tubular portion 52c in the tire radial direction A is shorter than the length L1 of the first tubular portion 52a and the second tubular portion 52b. Therefore, as the surface of the tread land portion 31 wears down from the initial state, the first tubular portion 52a and the second tubular portion 52b are exposed to the surface of the tread land portion 31 earlier than the third tubular portion 52c. As the wear on the surface of the tread land portion 31 further progresses, the third tubular portion 52c is exposed to the surface of the tread land portion 31. Therefore, the first tubular portion 52a, the second tubular portion 52b, and the third tubular portion 52c are all exposed to the surface of the tread land portion 31.

In this way, by varying the lengths of the plurality of tubular portions 52 extending from the bottom of the sipe to the outside in the tire radial direction A, the number of the tubular portions 52 to be exposed can be increased, as the wear on the surface of the tread land portion 31 progresses. This allows the cross-sectional area of the widened portion 51 to increase even as the wear on the surface of the tread land portion 31 progresses. Therefore, it is possible to achieve the compressive stiffness of the tread land portion 31 according to the amount of the wear on the surface of the tread land portion 31, and to improve wet gripping performance with a simple configuration during the progress of the wear on the tread land portion 31. Note that, the cross-sectional area of the tubular portion 52 in cross section perpendicular to the tire radial direction A means, in the same cross section, the area of a region sandwiched between opposite portions of the inner walls of the sipe 41 that constitute the tubular portion 52. In the present embodiment, the cross-sectional area of the tubular portion 52 in cross section perpendicular to the tire radial direction A means, in the same cross section, the area of a region sandwiched between the first recess 61 and the second recess 62.

Although the sipe longitudinal direction D of the sipe 41 of the present embodiment coincides with the tire width direction B, the sipe longitudinal direction D is not limited to the tire width direction B. Therefore, the sipe longitudinal direction D of the sipe 41 may coincide with, for example, the tire circumferential direction C. Also, the sipe longitudinal direction D of the sipe 41 may be, for example, a direction inclined to the tire width direction B and the tire circumferential direction C. Furthermore, the sipes 41 of the present embodiment each extend in a straight line in the surface of the tread land portion 31, but are not limited to this configuration. The sipes 41 may each extend in an arc, zigzag, or wavy shape in the surface of the tread land portion 31.

The sipes 41 of the present embodiment cross the rib-shaped land portion, as the tread land portion 31, in the tire width direction B and are connected to the circumferential grooves 21 on both sides in the tire width direction B, but are not limited to this configuration. For example, the sipes 41 may terminate in the tread land portion 31. The sipes 41 may be configured such that, for example, one end in the sipe longitudinal direction D is connected to the circumferential groove 21 and the other end in the sipe longitudinal direction D terminates in the tread land portion 31.

Furthermore, the sipes 41 of the present embodiment extend from the surface of the tread land portion 31 along the tire radial direction A inwardly in the tire radial direction A, but are not limited to this configuration. For example, the sipes 41 may extend from the surface of the tread land portion 31 in a direction inclined to the tire radial direction A inwardly in the tire radial direction A. In addition, the sipes 41 extend in straight lines from the surface of the tread land portion 31 inwardly in the tire radial direction A in a cross-sectional view (refer to FIGS. 3 and 4) perpendicular to the tire width direction B, but are not limited to this configuration. For example, the sipes 41 may extend, in the same cross-sectional view, in an arc, zigzag, or wavy shape from the surface of the tread land portion 31 inwardly in the tire radial direction A.

In the present embodiment, the length L1 (refer to FIGS. 3 and 4) of the first and second tubular portions 52a and 52b in the tire radial direction A is longer than the length L2 (refer to FIGS. 3 and 5) of the third tubular portion 52c in the tire radial direction A, but is not limited to this configuration. For example, the length of the first and second tubular portions 52a and 52b in the tire radial direction A may be shorter than the length of the third tubular portion 52c in the tire radial direction A. In addition, in the present embodiment, the first tubular portion 52a and the second tubular portion 52b have approximately equal length L1 in the tire radial direction A, but may have different lengths. None of the plurality of tubular portions 52 of the present embodiment is exposed to the surface of the tread land portion 31 in the initial state. However, the plurality of tubular portions 52 may include one that is exposed to the surface of the tread land portion 31 in the initial state, in other words, that extends from the bottom of the sipe to the tread surface T in the initial state.

Furthermore, the sipe 41 of the present embodiment has the three tubular portions 52, but is not limited to this configuration. In a case in which the widened portion 51 of the sipe 41 is constituted of only a plurality of tubular portions 52, the sipe 41 should be provided with at least two tubular portions 52 having different lengths in the tire radial direction A. Thus, the sipe 41 may have, for example, only two tubular portions 52. Alternatively, the sipe 41 may have, for example, four or more tubular portions 52.

The tubular portion 52 of the present embodiment is in an approximately circular shape in cross section perpendicular to the tire radial direction A, but is not limited to this cross-sectional shape. The tubular portion 52 may be in, for example, an oval shape or a polygonal shape such as a quadrangular shape, in the above cross section. That is, the first recess 61 and the second recess 62 of the present embodiment are in the arc shape in cross section perpendicular to the tire radial direction A, but are not limited to this configuration and may be various cross-sectional shapes such as, for example, a U-shape, V-shape, or rectangular shape. Furthermore, the tubular portion 52 of the present embodiment is constituted of the first recess 61 and the second recess 62, but is not limited to this configuration. The first recess 61 may be formed only in one of the inner walls of the sipe 41, and the other inner wall of the sipe 41 may be a flat portion that is flush with the second flat portion 64. Also, one of the inner walls of the sipe 41 may be a flat portion that is flush with the first flat portion 63, and the second recess 62 may be formed only in the other inner wall of the sipe 41.

The cross-sectional area of the tubular portion 52 of the present embodiment in cross section perpendicular to the tire radial direction A is constant regardless of the position in the tire radial direction A, but is not limited to this configuration. The cross-sectional area of the tubular portion 52 in cross section perpendicular to the tire radial direction A may vary depending on the position in the tire radial direction A. In particular, it is preferable that the cross-sectional area of the tubular portion 52 in cross section perpendicular to the tire radial direction A is larger on the inside than on the outside in the tire radial direction A. Thereby, even in a case in which the wear on the surface of the tread land portion 31 progresses from the initial state and all of the plurality of tubular portions 52 are exposed to the surface of the tread land portion 31, and thereafter the wear further progresses, increase in compressive stiffness can be prevented. Such tubular portions 52 have a configuration, for example, in which the sipe widths gradually increase inwardly in the tire radial direction A. With such tubular portions 52, it is possible to realize a configuration in which the cross-sectional areas of the tubular portions 52 perpendicular to the tire radial direction A gradually increase.

The plurality (three in the present embodiment) of tubular portions 52 of the present embodiment have an approximately equal cross-sectional area in the same cross section perpendicular to the tire radial direction A, but are not limited to this configuration. The plurality of tubular portions 52 may have different cross-sectional areas in the above cross section.

Second Embodiment

Figure 6:
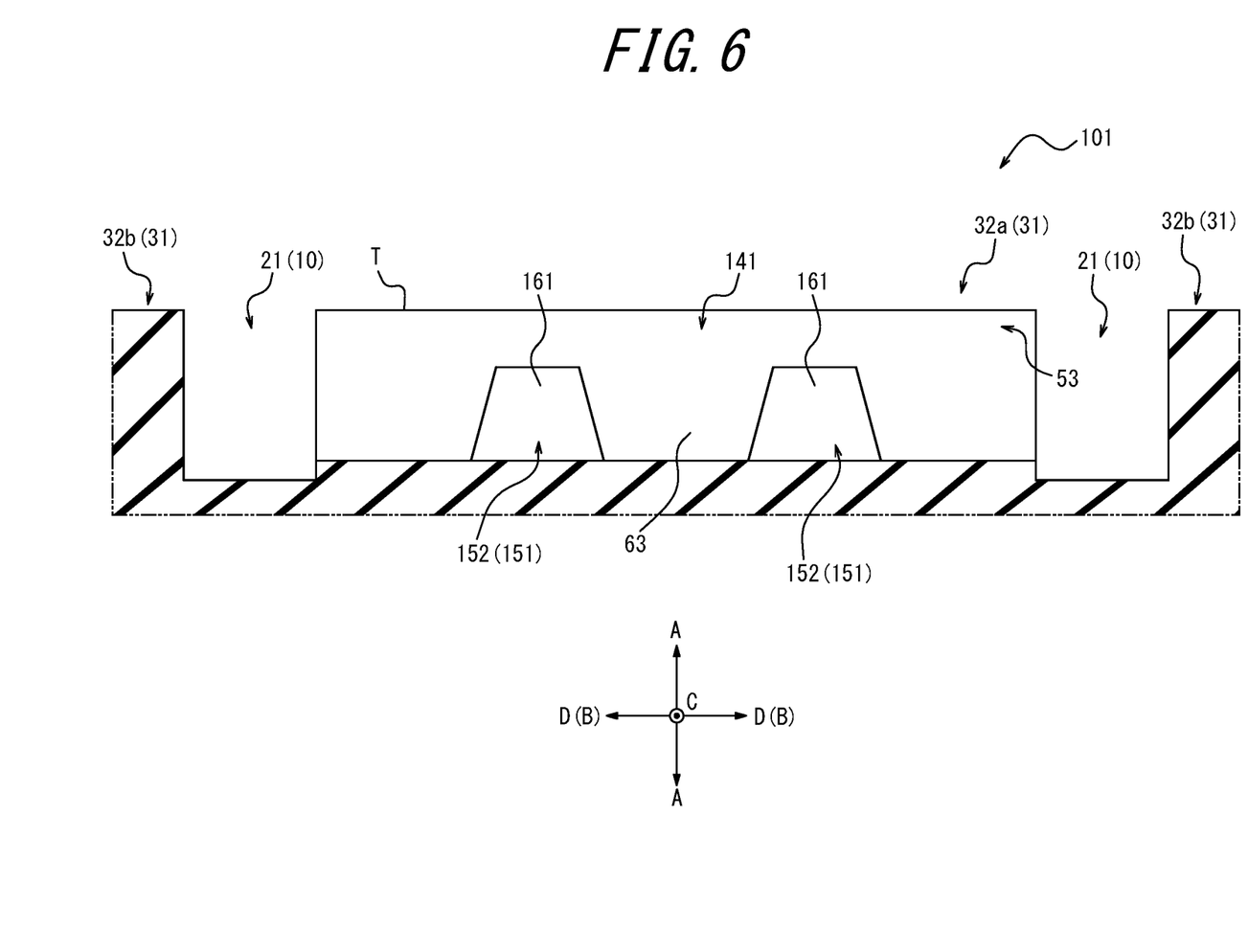
FIG. 6 is a drawing illustrating a sipe of the tire as a second embodiment of the present disclosure.
Figure 7:
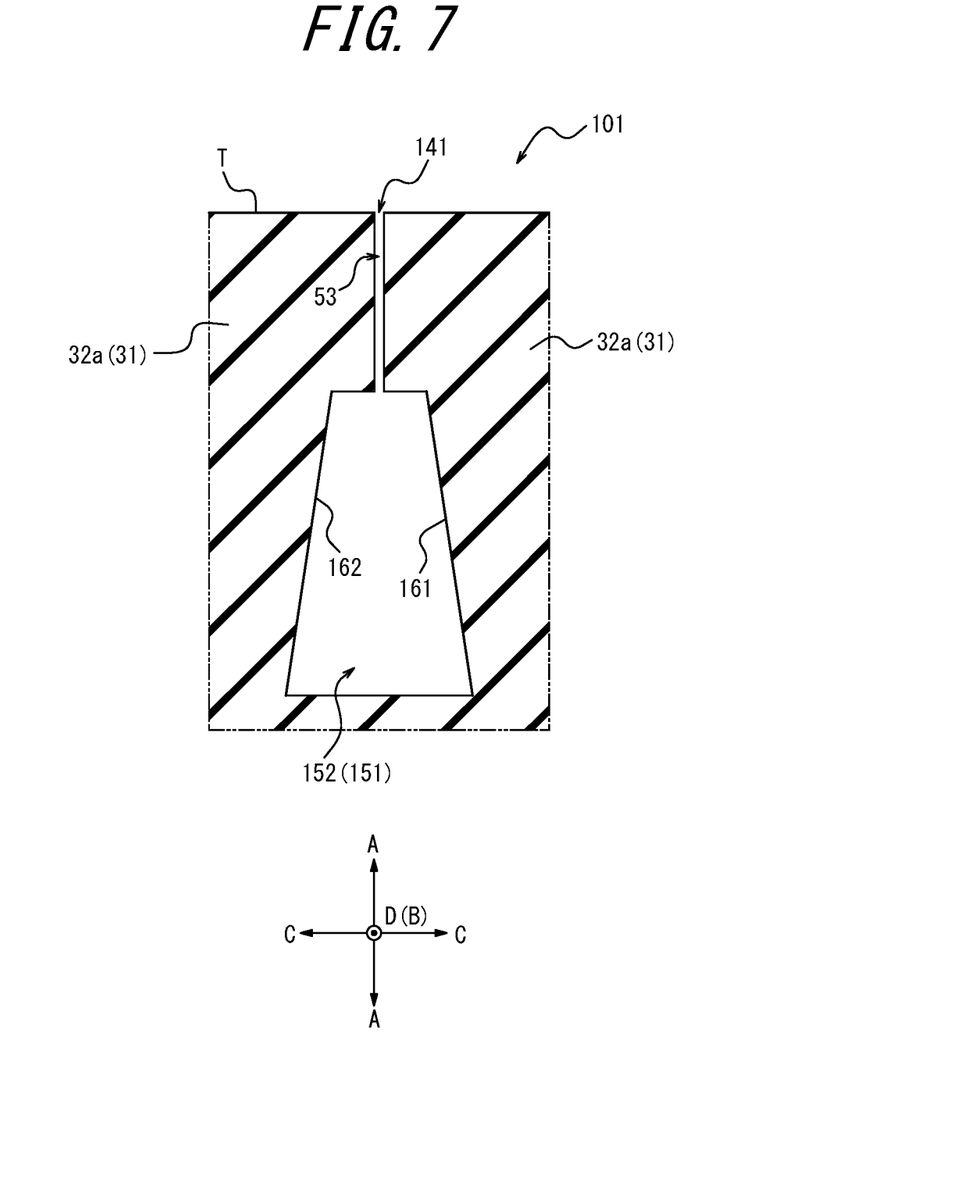
FIG. 7 is a drawing illustrating a widened portion of the sipe illustrated in FIG. 6 in cross section that is perpendicular to the cross section illustrated in FIG. 6 and that is parallel to a tire radial direction.

Next, a tire 101 as a second embodiment of the present invention will be exemplarily described. FIGS. 6 and 7 illustrate a sipe 141 of the tire 101. FIG. 6 is a cross-sectional view in the same position as FIG. 3. FIG. 7 is a drawing illustrating a widened portion 151 of the sipe 141 in cross section that is perpendicular to the cross section illustrated in FIG. 6 and parallel to the tire radial direction A. Compared with the tire 1 of the first embodiment, the tire 101 of the present embodiment differs in the configuration of the widened portion and shares other configurations. Therefore, here, the difference from the tire 1 of the first embodiment is mainly explained, and the common points are omitted.

The sipe 141 is provided with the widened portion 151 the sipe width of which is larger than positions adjacent in the sipe longitudinal direction D. The cross-sectional area of the widened portion 151 in cross section perpendicular to the tire radial direction A is larger on the inside than on the outside in the tire radial direction A. This point is the same as that of the widened portion 51 of the first embodiment.

As illustrated in FIGS. 6 and 7, the widened portion 151 of the present embodiment has tubular portions 152 extending from a bottom of the sipe outwardly in the tire radial direction A. This point is also similar to the tubular portions 52 of the first embodiment.

As illustrated in FIGS. 6 and 7, the cross-sectional area of each of the tubular portions 152 of the present embodiment in cross section perpendicular to the tire radial direction A is larger on the inside than on the outside in the tire radial direction A. The tubular portion 152 of the present embodiment differs from the tubular portion 52 of the above-described first embodiment in that this configuration is essential.

As illustrated in FIGS. 6 and 7, the sipe 141 of the present embodiment has the two tubular portions 152, but is not limited to this configuration. The sipe 141 should be provided with at least one tubular portion 152 the cross-sectional area of which in cross section perpendicular to the tire radial direction A is larger on the inside than on the outside in the tire radial direction A. By configuring such a tubular portion 152, wet gripping performance during the progress of wear on the tread land portion 31 can be enhanced with a simple configuration. Note that, the number of the tubular portions 152 to be provided in the single sipe 141 may be determined as appropriate according to the length of the sipe 141 in the sipe longitudinal direction D and other factors.

As illustrated in FIGS. 6 and 7, the tubular portions 152 are each constituted of a first recess 161 formed in one of inner walls of the sipe 141 and a second recess 162 formed in the other inner wall of the sipe 141 at an opposite position to the first recess 161. The tubular portion 152 of the present embodiment, which is constituted of the first recess 161 and the second recess 162, has a conical trapezoidal shape the diameter of which expands toward the inside in the tire radial direction A, but is not limited to this configuration, as long as the tubular portion 152 of the present embodiment is configured such that the cross-sectional area in cross section perpendicular to the tire radial direction A is larger on the inside than on the outside in the tire radial direction A.

Third Embodiment

Figure 8:
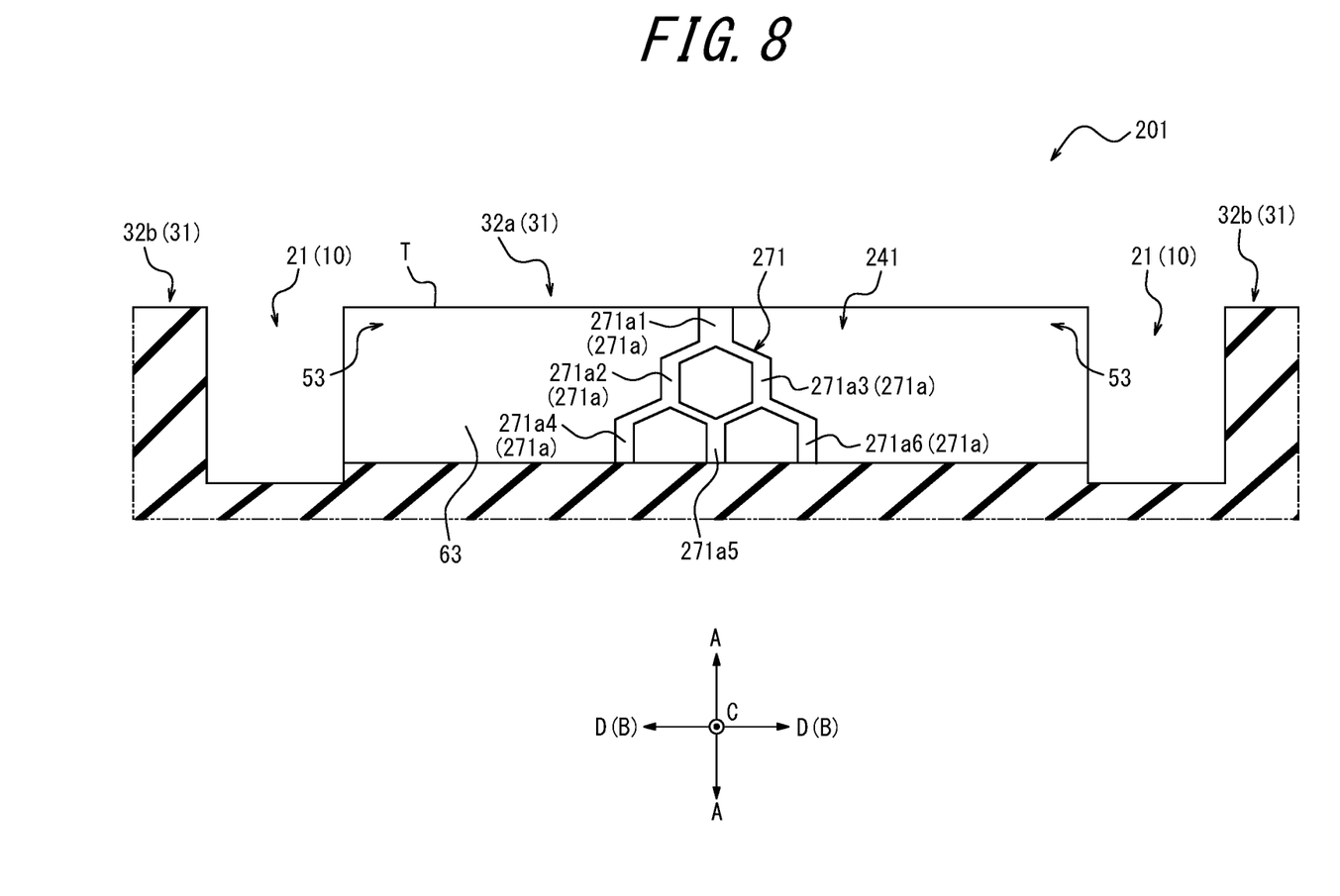
FIG. 8 is a drawing illustrating a sipe of the tire as a third embodiment of the present disclosure.
Figure 9:
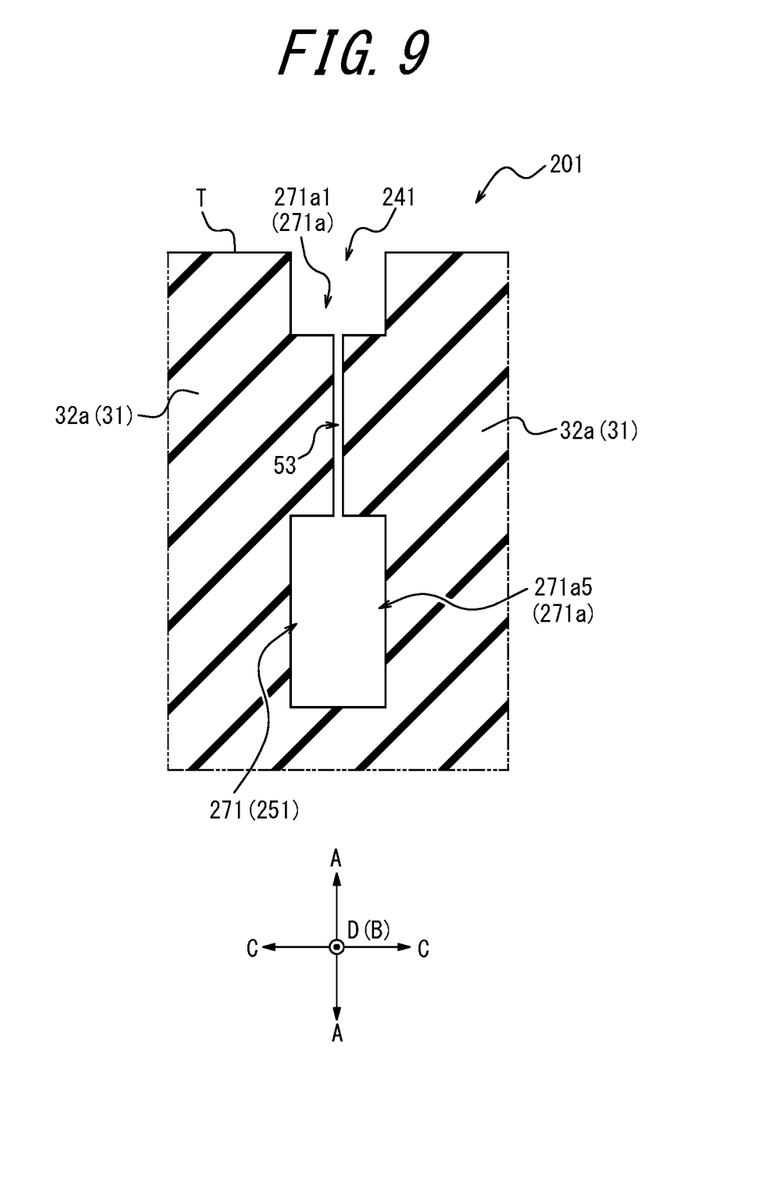
FIG. 9 is a drawing illustrating a widened portion of the sipe illustrated in FIG. 8 in cross section that is perpendicular to the cross section illustrated in FIG. 8 and that is parallel to the tire radial direction.

Next, a tire 201 as a third embodiment of the present invention will be exemplarily described. FIGS. 8 and 9 illustrate a sipe 241 of the tire 201. FIG. 8 is a cross-sectional view in the same position as FIG. 3. FIG. 9 is a drawing illustrating a widened portion 251 of the sipe 241 in cross section that is perpendicular to the cross section illustrated in FIG. 8 and parallel to the tire radial direction A. Compared with the tire 1 of the first embodiment, the tire 201 of the present embodiment differs in the configuration of the widened portion and shares other configurations. Therefore, here, the difference from the tire 1 of the first embodiment is mainly explained, and the common points are omitted.

As illustrated in FIGS. 8 and 9, the sipe 241 is provided with the widened portion 251 the sipe width of which is larger than positions adjacent in the sipe longitudinal direction D. The cross-sectional area of the widened portion 251 in cross section perpendicular to the tire radial direction A is larger on the inside than on the outside in the tire radial direction A. This point is the same as that of the widened portion 51 of the first embodiment.

As illustrated in FIGS. 8 and 9, the widened portion 251 of the present embodiment has a branch tubular portion 271 that branches into a plurality of portions in the sipe longitudinal direction D from the outside to the inside in the tire radial direction A. In the branch tubular portion 271, tubular pieces 271a are branched and increased from the outside to the inside in the tire radial direction A, so that the cross-sectional area of the branch tubular portion 271 in cross section perpendicular to the tire radial direction A increases.

Each of the tubular pieces 271a, which constitute the branch tubular portion 271, has a larger sipe width than positions adjacent in the sipe longitudinal direction D, as in the tubular portion 52 of the first embodiment. By configuring such a branch tubular portion 271, wet gripping performance during the progress of wear on the tread land portion can be enhanced with a simple configuration. The number of branches from each tubular piece 271a of the branch tubular portion 271, the shape and cross-sectional area of each tubular piece 271a in cross section perpendicular to the tire radial direction A, and the like are not particularly limited. That is, the configuration of each tubular piece 271a is not particularly limited as long as the cross-sectional area of the branch tubular portion 271 in cross section perpendicular to the tire radial direction A is larger on the inside than on the outside in the tire radial direction A. Note that, in the sipe 241 of the present embodiment, parts where the branch tubular portion 271 is not provided and parts between the six tubular pieces 271a are composed of slits 53.

As illustrated in FIG. 8, the branch tubular portion 271 of the present embodiment extends from a bottom of the sipe to the surface of the tread land portion 31. More specifically, in the branch tubular portion 271 of the present embodiment, one first tubular piece 271a1 extends from the surface of the tread land portion 31 inwardly in the tire radial direction A. An inner end of the one first tubular piece 271a1 in the tire radial direction A is branched in two into a second tubular piece 271a2 and a third tubular piece 271a3. An inner end of the second tubular piece 271a2 in the tire radial direction A is branched in two into a fourth tubular piece 271a4 and a fifth tubular piece 271a5. An inner end of the third tubular piece 271a3 in the tire radial direction A is branched in two into the fifth tubular piece 271a5 and a sixth tubular piece 271a6. Note that, the fifth tubular piece 271a5 is a tubular piece that is branched from each of the second tubular pieces 271a2 and the third tubular piece 271a3 and merged into one. In the present embodiment, inner ends of the first to sixth tube pieces 271a1 to 271a6 in the tire radial direction A have an approximately equal shape and cross-sectional area in cross section perpendicular to the tire radial direction A. Therefore, the cross-sectional area of the branch tubular portion 271 in cross section perpendicular to the tire radial direction A is larger on the inside than on the outside in the tire radial direction A.

As illustrated in FIG. 8, the sipe 241 of the present embodiment is provided with only one of the branch tubular portion 271, but is not limited to this configuration. A plurality of the branch tubular portions 271 may be provided at different positions in the sipe longitudinal direction D. That is, the sipe 241 should have at least one of the branch tubular portion 271. The number of the branch tubular portions 271 provided in the single sipe 241 may be determined as appropriate according to the length of the sipe 241 in the sipe longitudinal direction D and other factors.

The tire of the present disclosure is not limited to the specific configurations illustrated in the embodiments described above, but can be transformed and modified in various ways as long as it does not depart from the scope of the claims. In the first to third embodiments described above, the sipes 41, 141, and 241 are formed in the center land portion 32a as the tread land portion, but may be formed in the intermediate land portions 32b or the shoulder land portions 32c. In addition, the sipes 41, 141, and 241 of the first to third embodiments described above are formed in the rib-shaped land portion, but may be formed in a block-shaped land portion.

INDUSTRIAL APPLICABILITY

The present disclosure relates to a tire.

REFERENCE SIGNS LIST 1, 101, 201 Tire
1a Tread portion
1b Sidewall portion
1c Bead portion
3 Bead member
3a Bead core
3b Bead filler
4 Carcass
5 Inclined belt
6 Circumferential belt
7 Tread rubber
8 Side rubber
9 Inner liner
10 Partitioning groove
21 Circumferential groove
31 Tread land portion
32a Center land portion
32b Intermediate land portion
32c Shoulder land portion
41, 141, 241 Sipe
51, 151, 251 Widened portion
52, 152 Tubular portion
52a First tubular portion
52b Second tubular portion
52c Third tubular portion
53 Slit
61, 161 First recess
62, 162 Second recess
63 First flat portion
64 Second flat portion
65a, 66a Curved surface
65b, 66b Bottom surface
271 Branch tubular portion
271a Tubular piece
271a1-271a6 First to sixth tubular pieces
A Tire radial direction
B Tire width direction
C Tire circumferential direction
D Sipe longitudinal direction
CL Tire equatorial plane
L1, L2 Length of tubular portion in tire radial direction
T Tread surface
TE Tread edge.

The invention claimed is:

1. A tire comprising, in a tread surface, a tread land portion partitioned by two partitioning grooves, wherein
the tread land portion includes a sipe extending from a surface of the tread land portion inwardly in a tire radial direction,
the sipe includes a widened portion with a larger sipe width than a position adjacent in a sipe longitudinal direction,
a cross-sectional area of the widened portion in cross section perpendicular to the tire radial direction is larger on inside than on outside in the tire radial direction,
the widened portion includes a branch tubular portion branching into a plurality of portions in the sipe longitudinal direction from outside to inside in the tire radial direction and not being directly open to the two partitioning grooves, the branch tubular portion extends from a bottom of the sipe to the surface of the tread land portion, and the branch tubular portion includes:

a first tubular piece extending from the surface of the tread land portion inwardly in the tire radial direction;

a second tubular piece and a third tubular piece each branched from a radial inner end of the first tubular piece;

a fourth tubular piece branched from a radial inner end of the second tubular piece;

a fifth tubular piece branched from the radial inner end of the second tubular piece and a radial inner end of the third tubular piece and merged into one; and a sixth tubular piece branched from the radial inner end of the third tubular piece.

2. A tire comprising, in a tread surface, a tread land portion partitioned by two partitioning grooves, wherein the tread land portion includes a sipe extending from a surface of the tread land portion inwardly in a tire radial direction, the sipe includes a widened portion with a larger sipe width than a position adjacent in a sipe longitudinal direction, a cross-sectional area of the widened portion in cross section perpendicular to the tire radial direction is larger on inside than on outside in the tire radial direction, the widened portion includes a branch tubular portion branching into a plurality of portions in the sipe longitudinal direction from outside to inside in the tire radial direction and not being directly open to the two partitioning grooves, wherein the sipe includes a slit adjacent to the widened portion in the sipe longitudinal direction, and the branch tubular portion is connected to the two partitioning grooves via the slit.

\* \* \* \* \*